US008298670B2

(12) United States Patent
Muranaka et al.

(10) Patent No.: US 8,298,670 B2
(45) Date of Patent: Oct. 30, 2012

(54) ELECTRO-CONDUCTIVE MEMBER FOR ELECTROPHOTOGRAPHY, PROCESS CARTRIDGE, AND ELECTROPHOTOGRAPHIC APPARATUS

(75) Inventors: Norifumi Muranaka, Mishima (JP); Satoru Yamada, Numazu (JP); Seiji Tsuru, Susono (JP); Kazuhiro Yamauchi, Suntou-gun (JP); Yuka Hirakoso, Kounosu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/269,172

(22) Filed: Oct. 7, 2011

(65) Prior Publication Data

US 2012/0027456 A1 Feb. 2, 2012

Related U.S. Application Data

(63) Continuation of application No. PCT/JP2011/003595, filed on Jun. 23, 2011.

(30) Foreign Application Priority Data

Jul. 13, 2010 (JP) ................................ 2010-158615

(51) Int. Cl.

| | |
|---|---|
| ***B32B 9/04*** | (2006.01) |
| ***B32B 27/00*** | (2006.01) |
| ***G03G 21/16*** | (2006.01) |
| ***G03G 15/02*** | (2006.01) |
| ***G03G 15/06*** | (2006.01) |

(52) U.S. Cl. .................... 428/411.1; 399/111; 399/168; 399/222

(58) Field of Classification Search ....................... None
See application file for complete search history.

(56) References Cited

U.S. PATENT DOCUMENTS

| | | | |
|---|---|---|---|
| 6,127,622 | A | 10/2000 | Yamada et al. |
| 7,947,339 | B2 | 5/2011 | Yamauchi et al. |
| 2009/0258275 | A1 | 10/2009 | Kumagai et al. |
| 2012/0020700 | A1 | 1/2012 | Yamada et al. |

FOREIGN PATENT DOCUMENTS

| | | | |
|---|---|---|---|
| JP | 2003-142125 | A | 5/2003 |
| JP | 2004-175945 | A | 6/2004 |
| JP | 2006-189894 | A | 7/2006 |
| JP | 2009-69599 | A | 4/2009 |
| JP | 2009-259796 | A | 11/2009 |

OTHER PUBLICATIONS

PCT International Search Report and Written Opinion of the International Searching Authority, International Application No. PCT/JP2011/003595, Mailing Date Jul. 19, 2011.

Bates, et. al., "Block Copolymer Thermodynamics: Theory and Experiment", Annu. Rev. Phys. Chem., vol. 41, 1990, pp. 525-557.

Hirakoso, et al., U.S. Appl. No. 13/305,262, filed Nov. 28, 2011.

*Primary Examiner* — Sheeba Ahmed

(74) *Attorney, Agent, or Firm* — Fitzpatrick, Cella, Harper & Scinto

(57) ABSTRACT

Provided is the following electro-conductive member for electrophotography. The electrical resistance of the member hardly increases even by long-term energization, and hence the member is conducive to stable formation of high-quality electrophotographic images. The electro-conductive member for electrophotography, comprises: an electro-conductive mandrel and an electro-conductive layer, wherein said electro-conductive layer contains an A-B-A type triblock copolymer in which an A-block is a polystyrene having a cation exchange group, and a B-block is a polyolefin, and wherein said A-B-A type triblock copolymer forms a microphase-separated structure comprising a matrix phase formed of said B-block, and one phase formed of the A-block and having a structure selected from the group consisting of a cylindrical structure, a bicontinuous structure and a lamellar structure.

5 Claims, 5 Drawing Sheets

ELECTRO-CONDUCTIVE MEMBER FOR ELECTROPHOTOGRAPHY, PROCESS CARTRIDGE, AND ELECTROPHOTOGRAPHIC APPARATUS

CROSS-REFERENCE TO RELATED APPLICATIONS

This application is a continuation of International Application No. PCT/JP2011/003595, filed Jun. 23, 2011, which claims the benefit of Japanese Patent Application No. 2010-158615, filed Jul. 13, 2010.

BACKGROUND OF THE INVENTION

1. Field of the Invention

The present invention relates to an electro-conductive member for electrophotography for use in an image-forming apparatus that adopts an electrophotographic process, a process cartridge, and an electrophotographic apparatus.

2. Description of the Related Art

Japanese Patent Application Laid-Open No. 2006-189894 describes that an electro-conductive material obtained by adding a quaternary ammonium salt as an ionic electro-conductive agent to a polymer component such as a urethane rubber has been used as a material for forming a charging roller that charges a photosensitive drum of an electrophotographic apparatus. In addition, Japanese Patent Application Laid-Open No. 2006-189894 discloses that the above-mentioned ionic electro-conductive agent has a limited ability to reduce the electrical resistance of the charging roller, and that the electrical resistance of the charging roller formed of the above-mentioned electro-conductive material increases to a large extent when electricity is passed through the charging roller, and hence a trouble occurs in charging over time. In addition, Japanese Patent Application Laid-Open No. 2006-189894 discloses that the above-mentioned problems can be solved by using a quaternary ammonium salt having a specific structure as the ionic electro-conductive agent.

SUMMARY OF THE INVENTION

However, the inventors of the present invention have conducted investigations on the invention according to Japanese Patent Application Laid-Open No. 2006-189894, and as a result, have acknowledged that the suppression of the increase of the electrical resistance due to long-term application of a DC voltage to the charging roller still has room for improvement. In view of the foregoing, an object of the present invention is to provide the following electro-conductive member for electrophotography. The electrical resistance of the member hardly increases even when a DC voltage is applied over a long time period, and hence the member is conducive to stable formation of high-quality electrophotographic images. In addition, another object of the present invention is to provide a process cartridge and an electrophotographic apparatus conducive to long-term, stable formation of high-quality electrophotographic images.

According to the present invention, there is provided an electro-conductive member for electrophotography, comprising an electro-conductive mandrel and an electro-conductive layer, wherein said electro-conductive layer contains an A-B-A type triblock copolymer in which an A-block is a polystyrene having a cation exchange group, and a B-block is a polyolefin, and wherein said A-B-A type triblock copolymer forms a microphase-separated structure comprising a matrix phase formed of said B-block, and one phase formed of the A-block and having a structure selected from the group consisting of a cylindrical structure, a bicontinuous structure and a lamellar structure. In addition, according to the present invention, there is provided a process cartridge formed to be freely detachable from a main body of an electrophotographic apparatus, comprising the above-mentioned electro-conductive member for electrophotography as one member selected from a charging member and a developing member or as each of both the members. Further, according to the present invention, there is provided an electrophotographic apparatus, comprising the above-mentioned electro-conductive member for electrophotography as one member selected from a charging member and a developing member or as each of both the members.

According to the present invention, there can be obtained the following electro-conductive member for electrophotography. The electrical resistance of the member hardly increases even by long-term energization, and hence the member is conducive to stable formation of high-quality electrophotographic images. In addition, according to the present invention, there can be obtained a process cartridge and an electrophotographic apparatus with which high-quality electrophotographic images can be formed.

DESCRIPTION OF THE EMBODIMENTS

Hereinafter, a preferred embodiment of the present invention is described.

Electro-Conductive Member for Electrophotography

Figure 1:
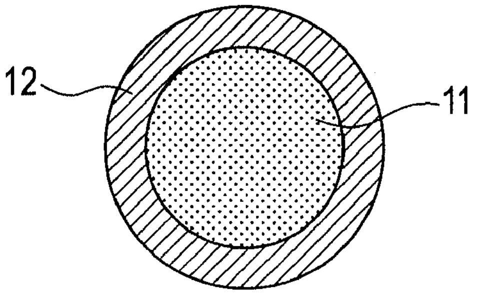
FIG. 1 is a schematic sectional view showing an example of an electro-conductive member for electrophotography of the present invention.

An electro-conductive member for electrophotography according to the present invention has an electro-conductive mandrel and an electro-conductive layer. In addition, the electro-conductive member for electrophotography can be formed only of the electro-conductive mandrel and the electro-conductive layer. The shape of the electro-conductive member for electrophotography according to the present invention can be a roller shape or a blade shape. Further, the electro-conductive member for electrophotography according to the present invention can be used as one member selected from a charging member and a developing member or as each of both the members in an electrophotographic apparatus. Hereinafter, the case where a roller-shaped electro-conductive member for electrophotography according to the present invention is used as a charging roller is described in detail. FIG. 1 shows a sectional view showing a specific construction of the charging roller. The charging roller shown in FIG. 1 is formed of an electro-conductive mandrel 11 and an electro-conductive layer 12 formed on the outer periphery of the mandrel.

Electro-Conductive Mandrel

The electro-conductive mandrel 11 to be used in the present invention is, for example, a cylinder obtained by plating the surface of a carbon steel alloy with nickel having a thickness of about 5 μm.

Electro-Conductive Layer

The electro-conductive layer 12 contains an A-B-A type triblock copolymer. In addition, an A-block and a B-block are each defined as described below.

(A-Block) A Polystyrene Having a Cation Exchange Group (B-Block) A Polyolefin

Here, the A-B-A type triblock copolymer is a three-component triblock copolymer in which the respective molecular ends of an A-polymer (A-block), a B-polymer (B-block), and the A-polymer (A-block) are connected in the order "A-B-A." The A-B-A type triblock copolymer forms such a microphase-separated structure that each A-block has a cylindrical structure, a bicontinuous structure, or a lamellar structure in a matrix phase formed of the B-block.

Each A-block in the A-B-A type triblock copolymer can be formed by polymerizing styrene as a monomer to provide a polystyrene (PS) and introducing the cation exchange group to the polystyrene.

In addition, the A-B-A type triblock copolymer can be produced by, for example, a production method including the following steps:

(1) a step involving polymerizing styrene to provide a PS;

(2) a step involving adding a monomer for use in the synthesis of a polyolefin (P0) to the PS and polymerizing the monomer to form a PS-PO block copolymer;

(3) a step involving adding styrene to the PS-PO block copolymer and polymerizing styrene to form a PS-PO-PS block copolymer; and (4) a step involving introducing the cation exchange group to each PS in the PS-PO-PS block copolymer.

Each A-block in the A-B-A type tirblock copolymer to be used in the present invention is a polystyrene having a cation exchange group, and the B-block in the copolymer is a polyolefin. Further, the A-B-A type triblock copolymer is preferably a thermoplastic elastomer in order that mechanical characteristics when the electro-conductive member is used as the charging roller may be additionally improved. In addition, the A-B-A type triblock copolymer can be synthesized by, for example, a living polymerization method. In this case, the molecular weight distribution of the polymer itself tends to be extremely narrow, and hence such a tendency that the amount of a low-molecular weight oligomer or polymer to be produced is nearly zero is observed. Accordingly, it can be assumed that such oligomer or polymer does not contribute to a fluctuation in the electrical resistance of the electro-conductive member. In the case of the A-B-A type triblock copolymer to be used in the present invention, its synthesis is particularly preferably performed by a living anion polymerization method out of the living polymerization methods because the low-molecular weight oligomer or polymer is particularly hardly obtained.

The A-B-A type triblock copolymer to be used in the present invention shows ionic conductivity because the polystyrene as each A-block has a cation exchange group. Further, the cation exchange group in the A-block is directly bonded to at least part of the styrene units in the polystyrene through a covalent bond. Accordingly, when the electro-conductive member is used as the charging roller, the cation exchange group does not move owing to long-term use of the charging roller, and hence an increase in the resistance of the charging roller during its use can be avoided.

In addition, when an ionic electro-conductive agent is added to a binder rubber such as a urethane rubber like Japanese Patent Application Laid-Open No. 2006-189894, the amount of the ionic electro-conductive agent that dissolves in the binder rubber is determined by the kinds of the binder rubber and the ionic electro-conductive agent, and hence a saturated dissolution amount or more of the ionic electro-conductive agent does not dissolve. As a result, when the saturated dissolution amount or more of the ionic electro-conductive agent is added to the binder rubber, the ionic electro-conductive agent merely agglomerates, and hence a resistance value that can be achieved by the electro-conductive roller may be limited. On the other hand, when the A-B-A type triblock copolymer in which the cation exchange group is directly bonded to at least part of the styrene units in the polystyrene like the present invention is used as a binder rubber, no agglomeration occurs in association with an increase in its addition amount. As a result, a reduction in the resistance of the electro-conductive roller can be achieved. It should be noted that the term "styrene unit" as used herein refers to a repeating unit of styrene.

The term "cation exchange group" refers to a functional group capable of contributing to the ionic conduction of a cation such as a proton. The cation exchange group to be used in the present invention is not particularly limited, and can be appropriately selected depending on purposes. Examples of the cation exchange group include a sulfonic group, a carboxylic group, a phosphate group, and a phosphite group, and at least one of these groups can be used. However, the cation exchange group is preferably at least one selected from the group consisting of a sulfonic group, a phosphate group, and a carboxylic group from such a viewpoint that the electrical conductivity of the charging roller is secured. Further, a sulfonic group is preferably used because particularly good electrical conductivity is obtained.

An electrical resistance value when the electro-conductive member is used as the charging roller is preferably set to $1\times10^3$ Ω·cm or more and $1\times10^9$ Ω·cm or less. It should be noted that when the electro-conductive member for electrophotography of the present invention is used as a developing roller, its electrical resistance value is also preferably set to fall within the range. In the present invention, the electrical resistance value of the charging roller can be adjusted by controlling the content of the cation exchange group bonded to the polystyrene in each A-block. The amount of the cation exchange group with respect to 100 mol % of all the styrene units (PS) in the A-blocks of the A-B-A type triblock copolymer is preferably 5 mol % or more and 50 mol % or less from such a viewpoint that the electrical resistance value is adjusted to fall within the above-mentioned range. In addition, the amount is more preferably 10 mol % or more and 30 mol % or less. The amount in which the cation exchange group is introduced into each A-block can be identified because a molar ratio between a styrene unit to which the cation exchange group is introduced and a styrene unit to which the group is not introduced in the polystyrene can be calculated by proton NMR measurement.

For example, when the cation exchange group is a sulfonic group, the following method can be given as a method of introducing the cation exchange group. First, a solution of the PS-PO-PS block copolymer in dichloromethane is prepared on the basis of, for example, the above-mentioned production method. Acetyl sulfate or chlorosulfonic acid is added to the solution. Thus, a sulfonic group can be selectively introduced to a styrene unit in the PS-PO-PS block copolymer.

In addition, to obtain a discharge characteristic satisfactory for the charging roller generally requires the formation of a stable nip between the charging roller and a body to be charged. Therefore, the A-B-A type triblock copolymer to be used in the present invention preferably serves as a thermoplastic elastomer to show rubber elasticity. Accordingly, the glass transition temperature of the polyolefin as the B-block is preferably 20° C. or less, more preferably 0° C. or less.

Examples of the B-block that satisfies the above-mentioned conditions include polyethylene-butylene (PEB), polyethylene-propylene (PEP), polyethylene-ethylene-propylene (PEEP), polyisobutylene (PIB), maleic acid-modified polyethylene-butylene (M-PEB), maleic acid-modified polyethylene-propylene (M-PEP), maleic acid-modified polyethylene-ethylene-propylene (M-PEEP), and maleic acid-modified polyisobutylene (M-PIB), but the B-block is not limited thereto.

The A-B-A type triblock copolymer according to the present invention undergoes a phase separation as a result of the following. A repulsive interaction acts between each A-block and the B-block as dissimilar polymers, and polymer chains of the same kind agglomerate. However, the copolymer cannot produce a phase-separated structure larger than the spread of each polymer chain owing to connectivity between the dissimilar polymer chains. As a result, the copolymer produces a periodic self-assembled structure of several nanometers to several hundreds of nanometers. Such structure is referred to as "microphase-separated structure."

Figure 4A:
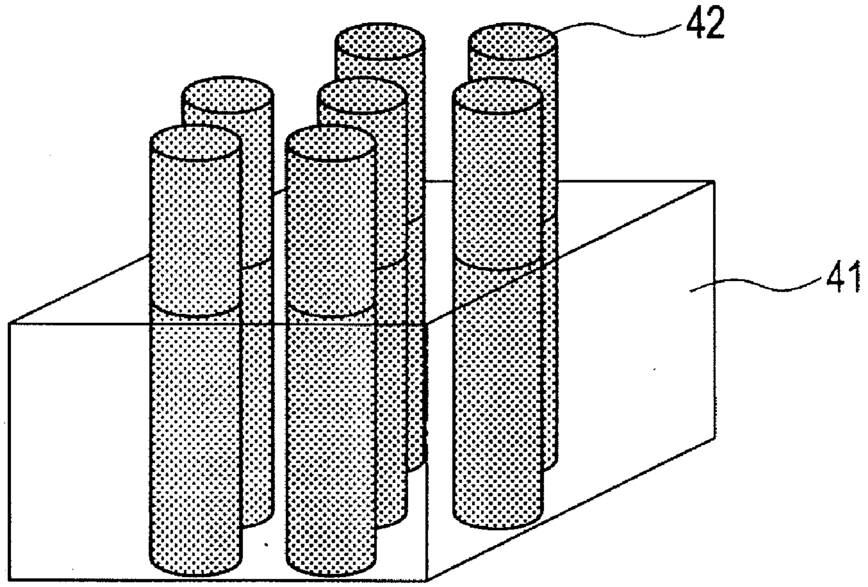
FIG. 4A is a schematic view of a microphase-separated structure according to the present invention in which a phase of a cylindrical structure is formed.
Figure 4B:
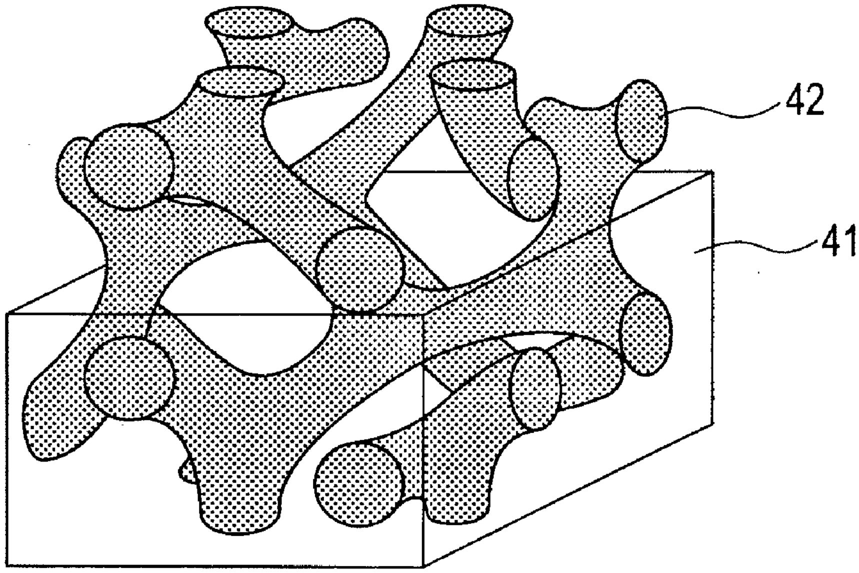
FIG. 4B is a schematic view of a microphase-separated structure according to the present invention in which a phase of a bicontinuous structure is formed.
Figure 4C:
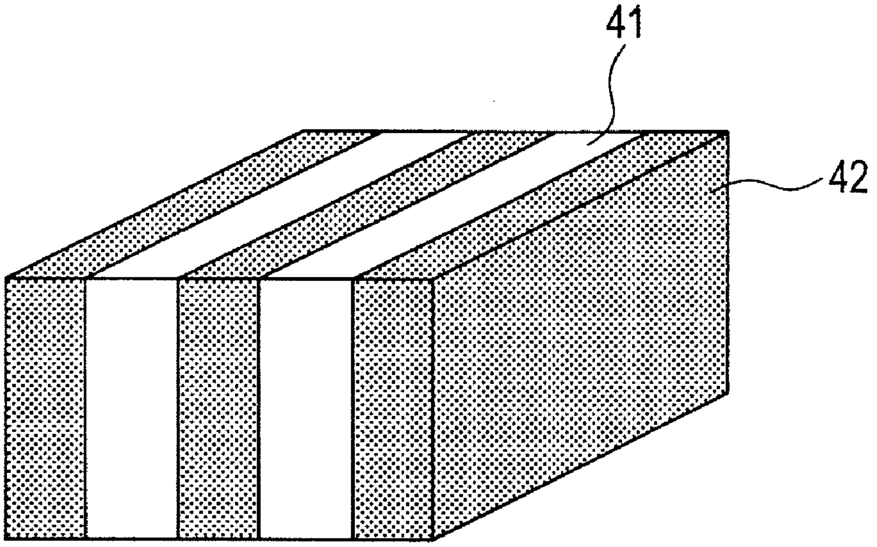
FIG. 4C is a schematic view of a microphase-separated structure according to the present invention in which a phase of a lamellar structure is formed.
Figure 5:
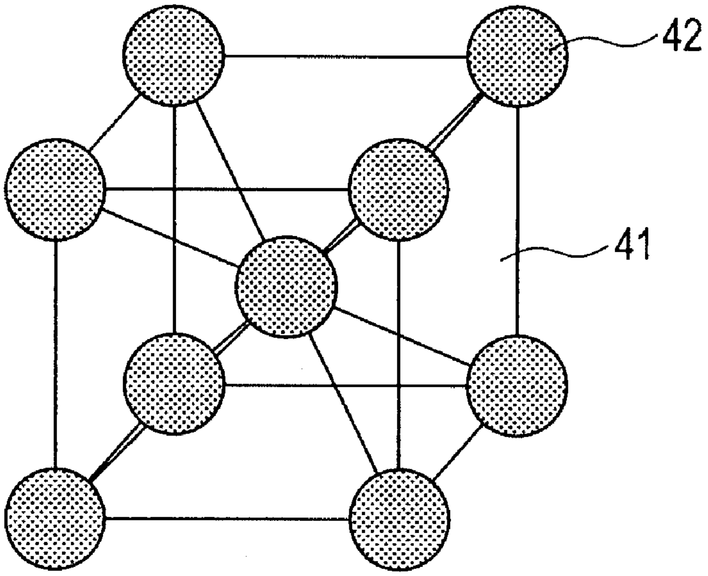
FIG. 5 is a schematic view of a microphase-separated structure in which a spherical phase is formed.

Bates, F. S.; Fredrickson, G. H.; Annu. Res. Phys. Chem. 1990 (41) 525 discloses such a microphase-separated structure formed by a block copolymer as described below. In a matrix formed of one polymer block, a phase formed of the other polymer block and having a spherical structure, a cylindrical structure, a bicontinuous structure, or a lamellar structure is present. FIGS. 4A, 4B, and 4C, and FIG. 5 each show a schematic view of the microphase-separated structure formed by the A-B-A type triblock copolymer according to the present invention. In FIGS. 4A, 4B, and 4C, and FIG. 5, reference numeral 41 represents a matrix phase formed of the B-block and reference numeral 42 represents a phase formed of the A-block. In addition, FIGS. 4A, 4B, and 4C show microphase-separated structures in which the phase 42 formed of the A-block has the cylindrical structure, the bicontinuous structure, and the lamellar structure, respectively. In addition, FIG. 5 shows a microphase-separated structure in which the phase formed of the A-block has the spherical structure.

As shown in each of FIGS. 4A, 4B, and 4C, the A-B-A type triblock copolymer to be used in the present invention forms such a microphase-separated structure that phases each formed of the A-block that contributes to ionic conduction and each having the cylindrical structure, the bicontinuous structure, or the lamellar structure are periodically present in a state of being oriented in one direction in the matrix phase formed of the B-block. Accordingly, the electro-conductive layer according to the present invention shows a good electrical characteristic. In general, in an equilibrium state, multiple phases having different structures out of the above-mentioned four types of phases of the cylindrical structure, the bicontinuous structure, the lamellar structure, and the spherical structure do not coexist in the microphase-separated structure. However, phases of different shapes may coexist in the microphase-separated structure under a special condition such as a non-equilibrium condition. Even in such case, as long as the cylindrical structure, bicontinuous structure, or lamellar structure formed of the A-block that contributes to ionic conduction is present in the microphase-separated structure, the copolymer is included in the category of the present invention. In addition, even when a phase of the spherical structure is present in part of the phases each formed of the A-block and each having any one of the cylindrical structure, the bicontinuous structure, and the lamellar structure, as long as the microphase-separated structure is such that the phases each having the cylindrical structure, the bicontinuous structure, or the lamellar structure are periodically formed, the copolymer is also included in the category of the present invention.

It should be noted that the microphase-separated structure of the block copolymer can be identified by directly observing the structure with a transmission electron microscope (TEM) or by performing crystal structure analysis based on small-angle X-ray scattering (SAXS) measurement. In the case of, for example, the observation with the TEM, the A-B-A type triblock copolymer to be used in the present invention is observed as described below when a hydrophilic stain such as phosphotungstic acid is used because each A-block having the cation exchange group is hydrophilic and the B-block formed of the polyolefin is hydrophobic. That is, the A-block is dimly observed and the B-block is brightly observed at the time of the observation with the TEM. Accordingly, it can be recognized that such a microphase-separated structure that the A-block has a phase of any one of the cylindrical structure, the bicontinuous structure, and the lamellar structure is formed and the B-block is a matrix phase.

Incidentally, the form of the microphase-separated structure varies depending on the composition of the constituents of the block copolymer. That is, the microphase-separated structures of various forms shown in FIGS. 4A to 4C and FIG. 5 can be produced by controlling a volume ratio between the A-component and B-component of the A-B-A type triblock copolymer. In addition, the microphase-separated structures according to FIGS. 4A to 4C according to the present invention can be specifically formed by setting a total volume fraction among the A-blocks and the B-block within the range of a ratio "A-blocks (total of the two A-blocks)/B-block"=15/85 to the ratio "A-blocks (total)/B-block"=60/40. The total volume fraction more preferably falls within the range of the ratio "A-blocks (total)/B-block"=20/80 to the ratio "A-blocks (total)/B-block"=50/50.

In addition, the number average molecular weight of the A-B-A type triblock copolymer is not particularly limited under such a condition that the microphase-separated structure is formed, provided that the number average molecular weight herein is preferably 10,000 or more and 500,000 or less, more preferably 20,000 or more and 100,000 or less because the hardness of the electro-conductive roller depends on the molecular weight. It should be noted that the number average molecular weight of the A-B-A type triblock copolymer can be calculated by the following method. That is, the number average molecular weight can be calculated from the number average molecular weight of the block copolymer before the introduction of the cation exchange group and the molecular weight of the cation exchange group in the A-B-A type triblock copolymer (value converted on the basis of the introduction amount of the cation exchange group calculated by proton NMR measurement or the like).

Further, a filler, a softening agent, a processing aid, a tackifier, a dispersant, a foaming agent, a resin particle, or the like can be added to the electro-conductive layer to be used in the present invention as required to such an extent that an effect of the present invention is not remarkably impaired. As long as the microphase-separated structure of the A-B-A type triblock copolymer is not collapsed, the copolymer may be mixed with any other binder resin or block copolymer. The content of the A-B-A type triblock copolymer in a mixture of the binder resin and the A-B-A type triblock copolymer is preferably 30 mass % or more, more preferably 50 mass % or more. When the content is 30 mass % or more, a phase separation between the A-B-A type triblock copolymer and the added binder resin due to an increase in the amount in which the binder resin is mixed is particularly suppressed, and hence the continuity of each A-component that contributes to ionic conduction can be easily secured.

In addition, an additional electro-conductive layer (such as a layer having the same composition as that of the electro-conductive layer to be used in the present invention or any other electro-conductive layer known in the field of an electro-conductive member for electrophotography) or a protective layer can be formed on the outer periphery of the electro-conductive layer 12 depending on purposes.

A known method such as an extrusion molding method, an injection molding method, or a compression molding method is given as a method of molding the electro-conductive layer 12, and the electro-conductive layer 12 can be obtained by molding an elastomer for forming the electro-conductive layer (material for forming an electro-conductive layer) by any such method as described above. The material for forming an electro-conductive layer can be formed only of the A-B-A type triblock copolymer, or can be prepared by mixing the copolymer with, for example, any such compounding agent as described above as required. In addition, the electro-conductive layer may be directly molded on the electro-conductive mandrel 11, or the electro-conductive mandrel 11 may be coated with the electro-conductive layer 12 molded into a tubular shape in advance. It should be noted that the shape of the electro-conductive layer 12 is preferably arranged by polishing its surface after its production.

Figure 2:
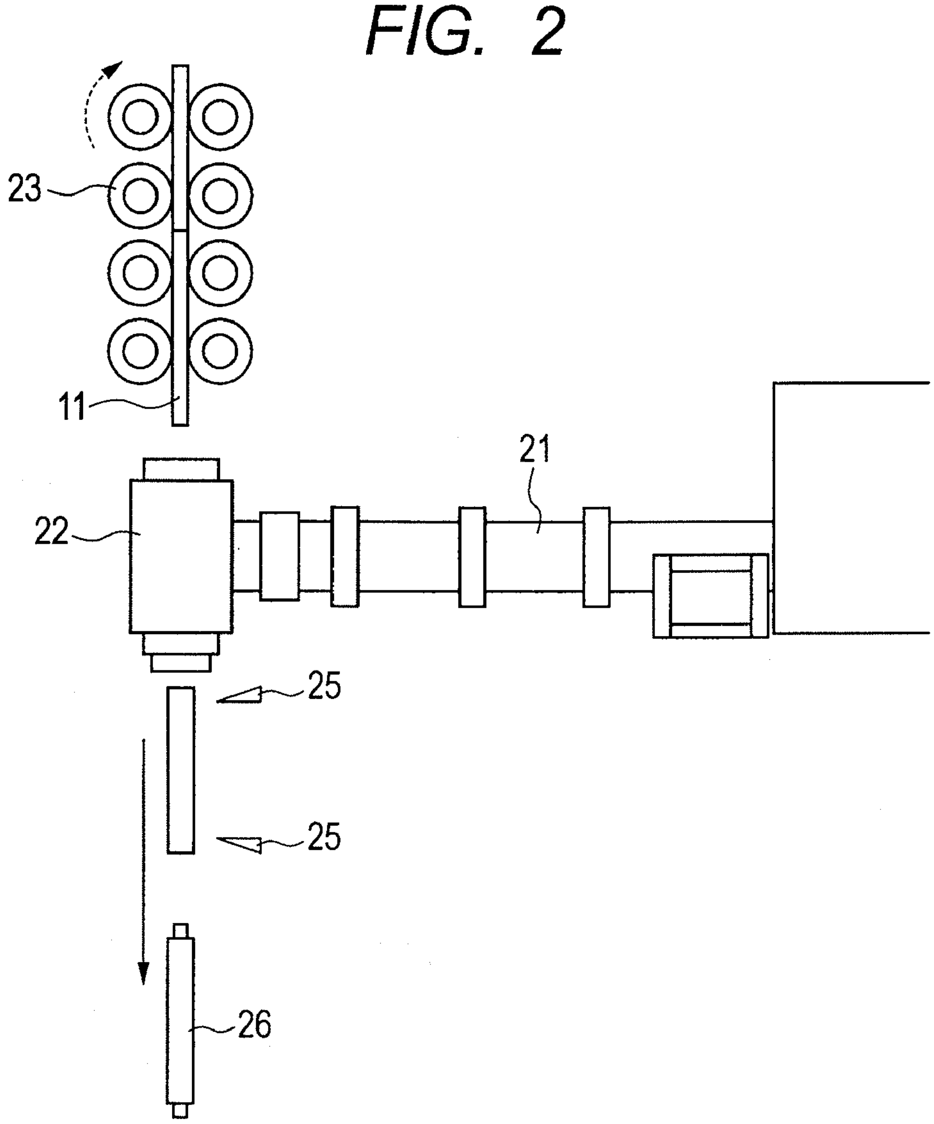
FIG. 2 is a schematic view showing an example of a cross-head extruder for producing an electro-conductive member for electrophotography.

In an extruder shown in FIG. 2, the electro-conductive mandrels 11 sequentially taken out of an electro-conductive mandrel-holding container (not shown) placed in the upper portion of the extruder are conveyed vertically downward without any gap by multiple pairs of mandrel-conveying rollers 23 for conveying the electro-conductive mandrels so as to be introduced to a crosshead 22. Meanwhile, the material for forming an electro-conductive layer is supplied by an extruder 21 from the direction perpendicular to the direction in which the electro-conductive mandrels are conveyed to the crosshead 22, and is then extruded from the crosshead 22 as an electro-conductive layer covering the periphery of each electro-conductive mandrel. After that, the electro-conductive layer is cut by cutting-and-removing unit 25, and then the resultant is divided every electro-conductive mandrel. Thus, a roller 26 is obtained.

In order that uniform adhesiveness between the charging roller and an electrophotographic photosensitive member may be easily secured, the electro-conductive layer is preferably formed into the following crown shape. The central portion of the layer is thickest, and the layer becomes thinner as the layer approaches each of both ends. The charging roller is generally used while being brought into abutment with the electrophotographic photosensitive member by applying a predetermined pressing force to each of both ends of a support. That is, the pressing force of the charging roller against the electrophotographic photosensitive member is larger at each of both ends in the width direction of the charging roller than at the central portion in the direction. Accordingly, when the charging roller is of the crown shape, a difference in pressing force between the central portion and each of both ends in the width direction of the charging roller is alleviated, and hence the occurrence of density unevenness in an electrophotographic image resulting from the difference in pressing force can be suppressed.

Electrophotographic Apparatus

Figure 6:
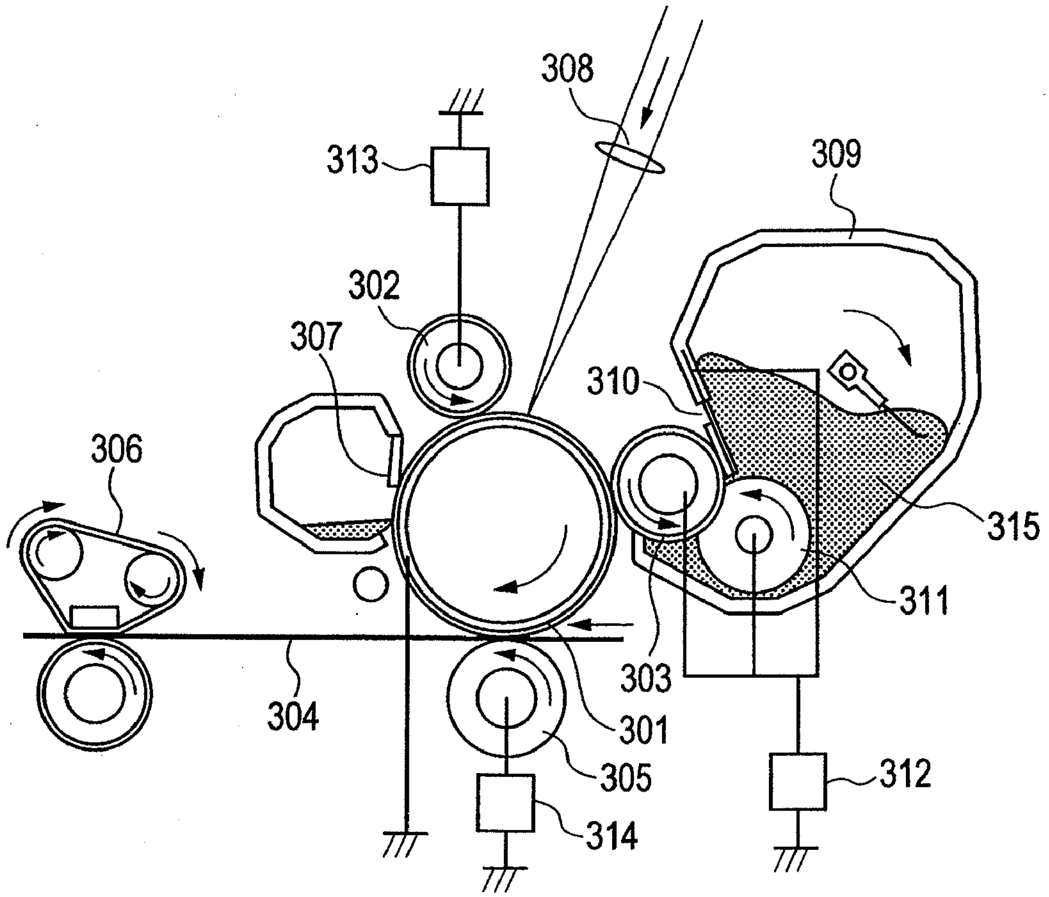
FIG. 6 is an explanatory diagram of an electrophotographic apparatus according to the present invention.

FIG. 6 is a schematic view of an electrophotographic apparatus using the electro-conductive member for electrophotography of the present invention as a charging roller. The electrophotographic apparatus is formed of, for example, a charging roller 302 that charges an electrophotographic photosensitive member 301, a latent image-forming apparatus 308 that performs exposure, a developing apparatus 303 that develops a latent image to provide a toner image, a transferring apparatus 305 that transfers the toner image onto a transfer material 304, a cleaning apparatus 307 that recovers transfer residual toner on the electrophotographic photosensitive member, and a fixing apparatus 306 that fixes the toner image. The electrophotographic photosensitive member 301 is of a rotating drum type having a photosensitive layer on an electro-conductive substrate. The electrophotographic photosensitive member 301 is rotationally driven in the direction indicated by an arrow at a predetermined circumferential speed (process speed). The charging roller 302 is placed so as to contact the electrophotographic photosensitive member 301 by being pressed against the member with a predetermined force. The charging roller 302 rotates by following the rotation of the electrophotographic photosensitive member 301, and charges the electrophotographic photosensitive member 301 to a predetermined potential by applying a predetermined DC voltage from a power source 313 for charging. An electrostatic latent image is formed by irradiating the uniformly charged electrophotographic photosensitive member 301 with light corresponding to image information. A developer 315 in a developer container 309 is supplied to the surface of the developing roller 303 placed so as to contact the electrophotographic photosensitive member 301 by a developer-supplying roller 311. After that, a layer of the developer charged so as to be of the same polarity as that of the charged potential of the electrophotographic photosensitive member is formed on the surface of the developing roller by a developer amount-regulating member 310. The electrostatic latent image formed on the electrophotographic photosensitive member is developed with the developer by reversal development. The transferring apparatus 305 has a contact transfer roller. The toner image is transferred from the electrophotographic photosensitive member 301 onto the transfer material 304 such as plain paper. It should be noted that the transfer material 304 is conveyed by a paper-feeding system having a conveying member. The cleaning apparatus 307 has a blade type cleaning member and a recovery container, and mechanically scrapes off and recovers the transfer residual toner remaining on the electrophotographic photosensitive member 301 after the transfer. Here, the cleaning apparatus 307 can be removed by adopting such a simultaneous-with-development cleaning mode that the transfer residual toner is recovered in the developing apparatus 303. The fixing apparatus 306 is formed of, for example, a heated roll, and fixes the transferred toner image to the transfer material 304 and then discharges the resultant to the outside of the apparatus. Reference numerals 312 and 314 each represent a DC power source.

Process Cartridge

Figure 7:
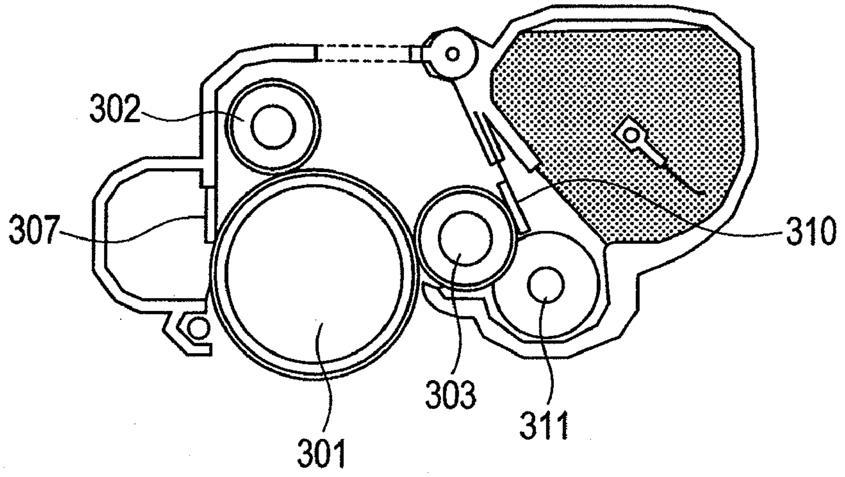
FIG. 7 is an explanatory diagram of a process cartridge according to the present invention.

In addition, FIG. 7 is a schematic sectional view of a process cartridge obtained by applying the electro-conductive member for electrophotography according to the present invention to the charging roller 302. As shown in FIG. 7, the process cartridge according to the present invention is such that the electrophotographic photosensitive member 301, the charging roller 302, the developing apparatus 303, the cleaning apparatus 307, and the like are integrated, and is formed so as to be detachable from the main body of an electrophotographic apparatus.

EXAMPLES

Hereinafter, the present invention is described in detail by way of examples. It should be noted that a charging roller and a developing roller were each produced as an electro-conductive member for electrophotography. First, a polymer used in the synthesis of a block copolymer included in the electro-conductive layer of each of those rollers is described below.

Synthesis of Polymer 1

Polymer 1 was synthesized by a living anion polymerization method. First, the air in a 5,000-ml pressure-resistant container was replaced with dry argon. After that, materials described in Table 1 below were loaded into the pressure-resistant container. Then, polymerization was performed under an argon atmosphere at 50° C. for 4 hours. Thus, a polystyrene (PS) was produced.

TABLE 1

| | |
|---|---|
| A styrene monomer refined with zeolite (trade name: Molecular Sieves 4A, manufactured by Aldrich) | 16.42 g |
| Cyclohexane refined with zeolite (trade name: Molecular Sieves 4A, manufactured by Aldrich) as a polymerization solvent | 10,000 ml |
| A 10-mass % solution of sec-butyllithium in hexane as an initiator | 0.80 g |

Next, 67.15 g of an isoprene monomer refined with activated alumina were loaded into the container, and then polymerization was performed at 50° C. for 2 hours. Thus, a polystyrene-polyisoprene block copolymer was produced. Further, 16.42 g of a styrene monomer refined with zeolite (trade name: Molecular Sieves 4A, manufactured by Aldrich) were loaded into the pressure-resistant container, and then polymerization was performed at a temperature of 50° C. for 4 hours. After the completion of the reaction, 20 ml of methanol were charged into the reaction solution so that the solution was reprecipitated with methanol. Thus, 100 g of a polystyrene-polyisoprene-polystyrene triblock copolymer were obtained. The copolymer had a number average molecular weight Mn measured by gel permeation chromatography (GPC) of 88,200. Next, the reaction product that had been dried was dissolved in 1 L of toluene, and then the solution was subjected to dry distillation at a temperature of 120° C. while being stirred in a nitrogen atmosphere. During the dry distillation, 500 g of p-toluenesulfonylhydrazine were added to the solution, and then the mixture was subjected to a reaction for 4 hours so that a diene-derived double bond was hydrogenated. Thus, a PS-PEP-PS block copolymer (polymer 1) was obtained. It should be noted that the polymer 1 had a number average molecular weight Mn of 94,600. Table 2 shows a ratio of the mass average molecular weight (Mw) to the number average molecular weight (Mn) of the polymer 1 measured by employing GPC.

Synthesis of Polymers 2 and 3, and Polymers 6 to 14

The synthesis of the respective polymers, i.e., polymers 2 and 3, and 6 to 14 was performed in the same manner as in the polymer 1 except that the compounding of the polymer was changed to any such compounding as shown in Table 2. It should be noted that a PEB and a PEEP in a polymer were synthesized by changing the isoprene monomer used in the synthesis of the polymer 1 to a butadiene monomer alone, and both the isoprene monomer and the butadiene monomer, respectively.

Polymer 4

Used for Polymer 4 was a polystyrene (PS)-polyisobutylene (PIB)-polystyrene (PS) triblock copolymer (SIBSTAR 102T (trade name) manufactured by Kaneka Corporation).

Polymer 5

Used for Polymer 5 was a polystyrene (PS)-maleic acid-modified polyethylene-butylene (M-PEB)-polystyrene (PS) triblock copolymer (FG1901G (trade name) manufactured by Kraton).

TABLE 2

| | Polymer | | | Compounding amount (g) | | | |
|---|---|---|---|---|---|---|---|
| Polymer No. | Composition (volume ratio) | Molecular weight Mn | Mw/Mn | Styrene First time | Isoprene | Butadiene | Styrene Second time |
| 1 | PS-PEP-PS 15:70:15 | 94,600 | 1.06 | 16.42 | 67.15 | 0.00 | 16.42 |
| 2 | PS-PEB-PS 15:70:15 | 88,200 | 1.04 | 16.67 | 0.00 | 66.67 | 16.67 |
| 3 | PS-PEEP-PS 15:70:15 | 102,300 | 1.08 | 16.54 | 33.46 | 33.46 | 16.54 |
| 6 | PS-PEP-PS 18:64:18 | 92,200 | 1.06 | 19.55 | 60.90 | 0.00 | 19.55 |
| 7 | PS-PEP-PS 25:50:25 | 86,400 | 1.05 | 26.65 | 46.70 | 0.00 | 26.65 |
| 8 | PS-PEB-PS 18:64:18 | 80,100 | 1.05 | 19.81 | 0.00 | 60.38 | 19.81 |
| 9 | PS-PEB-PS 25:50:25 | 82,600 | 1.04 | 26.92 | 0.00 | 46.15 | 26.92 |
| 10 | PS-PEEP-PS 18:64:18 | 103,000 | 1.07 | 19.68 | 30.32 | 30.32 | 19.68 |
| 11 | PS-PEEP-PS 25:50:25 | 101,100 | 1.06 | 26.79 | 23.21 | 23.21 | 26.79 |
| 12 | PS-PEP-PS 25:50:25 | 76,400 | 1.05 | 36.35 | 27.30 | 0.00 | 36.35 |
| 13 | PS-PEP 30:70 | 69,100 | 1.04 | 32.85 | 67.15 | 0.00 | 0.00 |

TABLE 2-continued

| | Polymer | | | Compounding amount (g) | | | |
|---|---|---|---|---|---|---|---|
| Polymer No. | Composition (volume ratio) | Molecular weight Mn | Mw/Mn | Styrene First time | Isoprene | Butadiene | Styrene Second time |
| 14 | PS-PEP-PS 4.5:91:4.5 | 92,200 | 1.06 | 6.18 | 87.64 | 0.00 | 6.18 |

Next, synthesis examples of block copolymers used in examples and comparative examples are described. In addition, Table 3 shows the constructions of the block copolymers of the respective examples.

Synthesis Example 1

Sulfonic Group-Containing PS-PEP-PS Block Copolymer

2 Grams of the resultant block copolymer (polymer 1) were dissolved in 80 ml of dichloromethane, and then the temperature of the solution was maintained at 40° C. Subsequently, an acetyl sulfate solution was separately produced by mixing and stirring 3.3 ml of acetic anhydride and 1.3 ml of concentrated sulfuric acid at 0° C. The resultant acetyl sulfate solution was gradually dropped to the above-mentioned solution of the PS-PEP-PS triblock copolymer in dichloromethane, and then the mixture was stirred at 50° C. for 6 hours. Next, 5 ml of methanol were dropped to the reaction solution to terminate the reaction. The product was washed with water and methanol, and was then dried. Thus, a sulfonic group-containing PS-PEP-PS triblock copolymer was obtained. The sulfonation ratio of the triblock copolymer was measured by proton NMR. As a result, it was found that 16 mol % of sulfonic groups were introduced to all styrene units (100 mol %). An ultra-thin section was cut out of the resultant triblock copolymer with a frozen section-cutting apparatus (trade name: Cryomicrotome, manufactured by JEOL Ltd.), and then the ultra-thin section was subjected to steam dyeing with ruthenium tetroxide. The ultra-thin section was observed with a transmission electron microscope (TEM). As a result, it was confirmed that a microphase-separated structure includes a polystyrene component having a sulfonic group formed a cylindrical in the matrix phase of the polyethylene propylene.

Synthesis Example 2

Sulfonic Group-Containing PS-PEB-PS Block Copolymer

A sulfonic group-containing PS-PEB-PS block copolymer was synthesized in accordance with Synthesis Example 1 except that the polymer 2 was used as a block copolymer. The sulfonation ratio of the copolymer was measured by proton NMR. As a result, it was found that 18 mol % of sulfonic groups were introduced to all styrene units. In addition, as a result of the observation of a microphase-separated structure with a TEM, it was confirmed that a microphase-separated structure includes a polystyrene component having a sulfonic group formed a cylindrical in the matrix phase of the PEB.

Synthesis Example 3

Sulfonic Group-Containing PS-PEEP-PS Block Copolymer

A sulfonic group-containing PS-PEEP-PS block copolymer was synthesized in accordance with Synthesis Example 1 except that the polymer 3 was used as a block copolymer. The sulfonation ratio of the copolymer was measured by proton NMR. As a result, it was found that 16 mol % of sulfonic groups were introduced to all styrene units. In addition, as a result of the observation of a microphase-separated structure with a TEM, it was confirmed that a microphase-separated structure includes a polystyrene component having a sulfonic group formed a cylindrical in the matrix phase of the PEEP.

Synthesis Example 4

Sulfonic Group-Containing PS-PIB-PS Block Copolymer

A sulfonic group-containing PS-PIB-PS block copolymer was synthesized in accordance with Synthesis Example 1 except that the polymer 4 was used as a block copolymer. The sulfonation ratio of the copolymer was measured by proton NMR. As a result, it was found that 17 mol % of sulfonic groups were introduced to all styrene units. In addition, as a result of the observation of a microphase-separated structure with a TEM, it was confirmed that a microphase-separated structure includes a polystyrene component having a sulfonic group formed a cylindrical in the matrix phase of the PIB.

Synthesis Example 5

Sulfonic Group-Containing PS-M-PEB-PS Block Copolymer

A sulfonic group-containing PS-M-PEB-PS block copolymer was synthesized in accordance with Synthesis Example 1 except that the polymer 5 was used as a block copolymer. The sulfonation ratio of the copolymer was measured by proton NMR. As a result, it was found that 16 mol % of sulfonic groups were introduced to all styrene units. In addition, as a result of the observation of a microphase-separated structure with a TEM, it was confirmed that a microphase-separated structure includes a polystyrene component having a sulfonic group formed a cylindrical in the matrix phase of the M-PEB.

Synthesis Example 6

Sulfonic Group-Containing PS-PEP-PS Block Copolymer

A sulfonic group-containing PS-PEP-PS block copolymer was obtained in accordance with Synthesis Example 1 except that the amounts of acetic anhydride and concentrated sulfuric acid were changed to 5.4 ml and 2.1 ml, respectively. The sulfonation ratio of the copolymer was measured by proton NMR. As a result, it was found that 29 mol % of sulfonic groups were introduced to all styrene units. In addition, as a result of the observation of a microphase-separated structure with a TEM, it was confirmed that a microphase-separated structure includes a polystyrene component having a sulfonic group formed a cylindrical in the matrix phase of the PEP.

Synthesis Example 7

Sulfonic Group-Containing PS-PEP-PS Block Copolymer

A sulfonic group-containing PS-PEP-PS block copolymer was obtained in accordance with Synthesis Example except that the amounts of acetic anhydride and concentrated sulfuric acid were changed to 2.0 ml and 0.8 ml, respectively. The sulfonation ratio of the copolymer was measured by proton NMR. As a result, it was found that 10 mol % of sulfonic groups were introduced to all styrene units. In addition, as a result of the observation of a microphase-separated structure with a TEM, it was confirmed that a microphase-separated structure includes a polystyrene component having a sulfonic group formed a cylindrical in the matrix phase of the PEP.

Synthesis Example 8

Sulfonic Group-Containing PS-PEP-PS Block Copolymer

A sulfonic group-containing PS-PEP-PS block copolymer was obtained in accordance with Synthesis Example 1 except that the polymer 6 was used as a block copolymer. The sulfonation ratio of the copolymer was measured by proton NMR. As a result, it was found that 16 mol % of sulfonic groups were introduced to all styrene units. In addition, as a result of the observation of a microphase-separated structure with a TEM, it was confirmed that a microphase-separated structure includes a polystyrene component having a sulfonic group formed a bicontinuous in the matrix phase of the PEP.

Synthesis Example 9

Sulfonic Group-Containing PS-PEP-PS Block Copolymer

A sulfonic group-containing PS-PEP-PS block copolymer was obtained in accordance with Synthesis Example 1 except that the polymer 7 was used as a block copolymer. The sulfonation ratio of the copolymer was measured by proton NMR. As a result, it was found that 17 mol % of sulfonic groups were introduced to all styrene units. In addition, as a result of the observation of a microphase-separated structure with a TEM, it was confirmed that a microphase-separated structure includes a polystyrene component having a sulfonic group formed a lamellar in the matrix phase of the PEP.

Synthesis Example 10

Sulfonic Group-Containing PS-PEB-PS Block Copolymer

A sulfonic group-containing PS-PEB-PS block copolymer was obtained in accordance with Synthesis Example 2 except that the polymer 8 was used as a block copolymer. The sulfonation ratio of the copolymer was measured by proton NMR. As a result, it was found that 16 mol % of sulfonic groups were introduced to all styrene units. In addition, as a result of the observation of a microphase-separated structure with a TEM, it was confirmed that a microphase-separated structure includes a polystyrene component having a sulfonic group formed a bicontinuous in the matrix phase of the PEB.

Synthesis Example 11

Sulfonic Group-Containing PS-PEB-PS Block Copolymer

A sulfonic group-containing PS-PEB-PS block copolymer was obtained in accordance with Synthesis Example 2 except that the polymer 9 was used as a block copolymer. The sulfonation ratio of the copolymer was measured by proton NMR. As a result, it was found that 17 mol % of sulfonic groups were introduced to all styrene units. In addition, as a result of the observation of a microphase-separated structure with a TEM, it was confirmed that a microphase-separated structure includes a polystyrene component having a sulfonic group formed a lamellar in the matrix phase of the PEB.

Synthesis Example 12

Sulfonic Group-Containing PS-PEEP-PS Block Copolymer

A sulfonic group-containing PS-PEEP-PS block copolymer was synthesized in accordance with Synthesis Example 3 except that the polymer 10 was used as a block copolymer. The sulfonation ratio of the copolymer was measured by proton NMR. As a result, it was found that 18 mol % of sulfonic groups were introduced to all styrene units. In addition, as a result of the observation of a microphase-separated structure with a TEM, it was confirmed that a microphase-separated structure includes a polystyrene component having a sulfonic group formed a bicontinuous in the matrix phase of the PEEP.

Synthesis Example 13

Sulfonic Group-Containing PS-PEEP-PS Block Copolymer

A sulfonic group-containing PS-PEEP-PS block copolymer was synthesized in accordance with Synthesis Example 3 except that the polymer 11 was used as a block copolymer. The sulfonation ratio of the copolymer was measured by proton NMR. As a result, it was found that 15 mol % of sulfonic groups were introduced to all styrene units. In addition, as a result of the observation of a microphase-separated structure with a TEM, it was confirmed that a microphase-separated structure includes a polystyrene component having a sulfonic group formed a lamellar in the matrix phase of the PEEP.

Synthesis Example 14

Phosphate Group-Containing PS-PEP-PS Block Copolymer

2 Grams of the block polymer (polymer 1) were dissolved in 80 ml of dimethylformamide, and then the temperature of the solution was maintained at 40° C. 0.8 Gram of nickel chloride was added to the solution of the PS-PEP-PS triblock copolymer in dimethylformamide. After that, 1.8 g of triethyl phosphite was subsequently dropped to the mixture in a gradual fashion, and then the whole was stirred at 110° C. for 4 hours. Next, the reaction solution was cooled to room temperature so that the reaction was terminated. The product was washed with water and methanol, and was then dried. Thus, a phosphate group-containing PS-PEP-PS triblock copolymer was obtained. The phosphorylation ratio of the triblock copolymer was measured by proton NMR. As a result, it was found that 15 mol % of phosphate groups were introduced to all styrene units. An ultra-thin section was cut out of the resultant triblock copolymer with a Cryomicrotome, and then the ultra-thin section was subjected to steam dyeing with ruthenium tetroxide. The ultra-thin section was observed with a transmission electron microscope (TEM). As a result, it was confirmed that a microphase-separated structure includes a polystyrene component having a phosphate group formed a cylindrical in the matrix phase of the PEP.

Synthesis Example 15

Phosphate Group-Containing PS-PEP-PS Block Copolymer

A phosphate group-containing PS-PEP-PS block copolymer was synthesized in accordance with Synthesis Example 14 except that the polymer 6 was used as a block copolymer. The phosphorylation ratio of the copolymer was measured by proton NMR. As a result, it was found that 18 mol % of phosphate groups were introduced to all styrene units. In addition, as a result of the observation of a microphase-separated structure with a TEM, it was confirmed that a microphase-separated structure includes a polystyrene component having a phosphate group formed a bicontinuous in the matrix phase of the PEP.

Synthesis Example 16

Phosphate Group-Containing PS-PEP-PS Block Copolymer

A phosphate group-containing PS-PEP-PS block copolymer was synthesized in accordance with Synthesis Example 14 except that the polymer 7 was used as a block copolymer. The phosphorylation ratio of the copolymer was measured by proton NMR. As a result, it was found that 17 mol % of phosphate groups were introduced to all styrene units. In addition, as a result of the observation of a microphase-separated structure with a TEM, it was confirmed that a microphase-separated structure includes a polystyrene component having a phosphate group formed a lamellar in the matrix phase of the PEP.

Synthesis Example 17

Carboxylic Group-Containing PS-PEP-PS Block Copolymer

The polymer 1 was used as a block copolymer. 2 Grams of the PS-PEP-PS triblock copolymer were dissolved in 80 ml of dimethylformamide, and then the temperature of the solution was maintained at 40° C. 0.9 Gram of aluminum chloride was added to the solution of the PS-PEP-PS triblock copolymer in dimethylformamide. After that, 1.6 g of 1-chlorobutane was subsequently dropped to the mixture in a gradual fashion, and then the whole was stirred at 110° C. for 4 hours. Next, the reaction solution was cooled to room temperature so that the reaction was terminated. The product was washed with ethanol, and was then dissolved in dimethylformamide again. 1.0 Gram of potassium permanganate was added to the solution, and then the mixture was stirred at 40° C. for 4 hours. The product was washed with water and methanol, and was then dried. Thus, a carboxylic group-containing PS-PEP-PS triblock copolymer was obtained. The carboxylation ratio of the triblock copolymer was measured by proton NMR. As a result, it was found that 16 mol % of carboxylic groups were introduced to all styrene units.

An ultra-thin section was cut out of the resultant triblock copolymer with a Cryomicrotome, and then the ultra-thin section was subjected to steam dyeing with ruthenium tetroxide. The ultra-thin section was observed with a transmission electron microscope (TEM). As a result, it was confirmed that a microphase-separated structure includes a polystyrene component having a carboxylic group formed a cylindrical in the matrix phase of the PEP.

Synthesis Example 18

Carboxylic Group-Containing PS-PEP-PS Block Copolymer

A carboxylic group-containing PS-PEP-PS block copolymer was synthesized in accordance with Synthesis Example 17 except that the polymer 6 was used as a block copolymer. The carboxylation ratio of the copolymer was measured by proton NMR. As a result, it was found that 16 mol % of carboxylic groups were introduced to all styrene units. In addition, as a result of the observation of a microphase-separated structure with a TEM, it was confirmed that a microphase-separated structure includes a polystyrene component having a carboxylic group formed a bicontinuous in the matrix phase of the PEP.

Synthesis Example 19

Carboxylic Group-Containing PS-PEP-PS Block Copolymer

A carboxylic group-containing PS-PEP-PS block copolymer was synthesized in accordance with Synthesis Example 17 except that the polymer 7 was used as a block copolymer. The carboxylation ratio of the copolymer was measured by proton NMR. As a result, it was found that 16 mol % of carboxylic groups were introduced to all styrene units. In addition, as a result of the observation of a microphase-separated structure with a TEM, it was confirmed that a microphase-separated structure includes a polystyrene component having a carboxylic group formed a lamellar in the matrix phase of the PEP.

Synthesis Example 20

Sulfonic Group-Containing PS-PEP-PS Block Copolymer

A sulfonic group-containing PS-PEP-PS block copolymer was synthesized in accordance with Synthesis Example 1 except that the polymer 12 was used as a block copolymer. The sulfonation ratio of the copolymer was measured by proton NMR. As a result, it was found that 13 mol % of sulfonic groups were introduced to all styrene units. In addition, as a result of the observation of a microphase-separated structure with a TEM, it was confirmed that a microphase-separated structure (reverse cylindrical microphase-separated structure) includes a polyethylene propylene component formed a cylindrical in the matrix phase of the polystyrene component having a sulfonic group.

Synthesis Example 21

PS-PEP-PS Block Copolymer

A PS-PEP-PS block copolymer was synthesized in accordance with Synthesis Example 1 except that the polymer 1 (PS-PEP-PS block copolymer) was used as it was without the introduction of any cation exchange group. As a result of the observation of a microphase-separated structure with a TEM, it was confirmed that a microphase-separated structure includes a polystyrene component formed a cylindrical in the matrix phase of the PEP.

Synthesis Example 22

Sulfonic Group-Containing PS-PEP Block Copolymer

A sulfonic group-containing PS-PEP block copolymer (A-B type block copolymer) was synthesized in accordance with Synthesis Example 1 except that the polymer 13 was used as a block copolymer. The sulfonation ratio of the copolymer was measured by proton NMR. As a result, it was found that 16 mol % of sulfonic groups were introduced to all styrene units. In addition, as a result of the observation of a microphase-separated structure with a TEM, it was confirmed that a microphase-separated structure includes a polystyrene component having a sulfonic group formed a cylindrical in the matrix phase of the PEP.

Synthesis Example 23

Sulfonic Group-Containing PS-PEP-PS Block Copolymer

A sulfonic group-containing PS-PEP-PS block copolymer was obtained in accordance with Synthesis Example 1 except that: the polymer 14 was used as a block copolymer; and the amounts of acetic anhydride and concentrated sulfuric acid were changed to 1.1 ml and 0.4 ml, respectively. The sulfonation ratio of the copolymer was measured by proton NMR. As a result, it was found that 14 mol % of sulfonic groups were introduced to all styrene units. In addition, as a result of the observation of a microphase-separated structure with a TEM, it was confirmed that a microphase-separated structure includes a polystyrene component having a sulfonic group formed a spherical in the matrix phase of the PEP. It should be noted that the respective block copolymers synthesized in Synthesis Examples 1 to 23 may be referred to as samples of Synthesis Examples 1 to 23.

TABLE 3

Electro-conductive layer material (block copolymer)

| Synthesis Example | Polymer No. | A-block | B-block | Cation exchange group | Introduction amount of cation exchange group (mol %) | Type of microphase-separated structure |
|---|---|---|---|---|---|---|
| 1 | 1 | PS | PEP | Sulfonic group | 16 | Cylindrical |
| 2 | 2 | PS | PEB | Sulfonic group | 18 | Cylindrical |
| 3 | 3 | PS | PEEP | Sulfonic group | 16 | Cylindrical |

TABLE 3-continued

Electro-conductive layer material (block copolymer)

| Synthesis Example | Polymer No. | A-block | B-block | Cation exchange group | Introduction amount of cation exchange group (mol %) | Type of microphase-separated structure |
|---|---|---|---|---|---|---|
| 4 | 4 | PS | PIB | Sulfonic group | 17 | Cylindrical |
| 5 | 5 | PS | M-PEB | Sulfonic group | 16 | Cylindrical |
| 6 | 1 | PS | PEP | Sulfonic group | 29 | Cylindrical |
| 7 | 1 | PS | PEP | Sulfonic group | 10 | Cylindrical |
| 8 | 6 | PS | PEP | Sulfonic group | 16 | Bicontinuous |
| 9 | 7 | PS | PEP | Sulfonic group | 17 | Lamellar |
| 10 | 8 | PS | PEB | Sulfonic group | 16 | Bicontinuous |
| 11 | 9 | PS | PEB | Sulfonic group | 17 | Lamellar |
| 12 | 10 | PS | PEEP | Sulfonic group | 18 | Bicontinuous |
| 13 | 11 | PS | PEEP | Sulfonic group | 15 | Lamellar |
| 14 | 1 | PS | PEP | Phosphate group | 15 | Cylindrical |
| 15 | 6 | PS | PEP | Phosphate group | 18 | Bicontinuous |
| 16 | 7 | PS | PEP | Phosphate group | 17 | Lamellar |
| 17 | 1 | PS | PEP | Carboxylic group | 16 | Cylindrical |
| 18 | 6 | PS | PEP | Carboxylic group | 16 | Bicontinuous |
| 19 | 7 | PS | PEP | Carboxylic group | 16 | Lamellar |
| 20 | 12 | PS | PEP | Sulfonic group | 13 | Reverse cylindrical |
| 21 | 1 | PS | PEP | None | None | Cylindrical |
| 22 | 13 | PS | PEP | Sulfonic group | 16 | Cylindrical |
| 23 | 14 | PS | PEP | Sulfonic group | 14 | Spherical |

Charging Roller

Hereinafter, an example of the case where the electro-conductive member for electrophotography of the present invention was produced and used as a charging roller is described.

Example 1

Production of Charging Roller

A stainless rod mandrel having an outer diameter ϕ (diameter) of 6 mm and a length in its axial direction of 258 mm was prepared and plated with nickel having a thickness of about 5 μm. Thus, the electro-conductive mandrel 11 was obtained. Next, the electro-conductive mandrel 11 was molded into a roller by integrally extruding the electro-conductive mandrel 11 and the sample of Synthesis Example 1 as a material for forming an electro-conductive layer with the extruder schematically shown in FIG. 2. After that, roller ends were cut and removed by the cutting-and-removing unit 25. Thus, an electro-conductive roller whose portion coated with the electro-conductive layer had a length in its axial direction of 232 mm was obtained. The electro-conductive roller was subjected to wet grinding with a broad polisher (roller-dedicated CNC grinding machine LEO-600-F4L-BME (trade name)) at a cutting rate of 2 m/min until the central outer diameter became 8.5 mm and the outer diameter at each of both ends in the axial direction of the electro-conductive layer became 8.3 mm. Thus, a crown-shaped charging roller was obtained. It should be noted that the hardness of the charging roller measured on the basis of JIS-K6253 was 68°.

Evaluation 1

Figure 3:
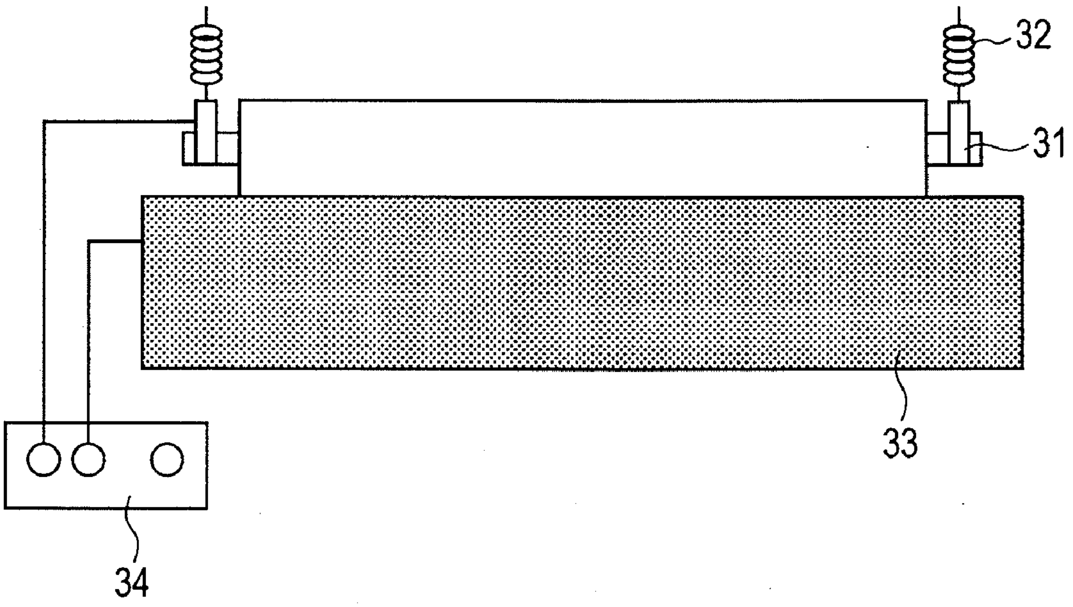
FIG. 3 is a schematic view showing an example of a resistance-measuring machine.

FIG. 3 shows a schematic view of an electrical resistance-measuring apparatus used in an evaluation. The charging roller was held so as to freely rotate with bearings 31 attached to both ends of the roller, and was then brought into press contact with a cylindrical aluminum drum 33 having a Φ (diameter) of 30 mm with springs 32 attached to the bearings 31 at pressure on each side of 4.90 N (500 gf). While the aluminum drum 33 was rotationally driven at 30 rpm, the charging roller was caused to follow the rotation. Then, a voltage was applied from an external power source 34 (TReK Model 610E (trade name)) under a constant current control mode for 305 seconds in such a manner that a DC current of 100 μA flowed into the charging roller through the aluminum drum 33. At this time, output voltages at an initial stage (for 5 seconds after a lapse of 2 seconds from the application) and after a lapse of 300 seconds (for 5 seconds after the lapse of 300 seconds) were measured at a sampling frequency of 100 Hz. At this time, the average of the output voltages for 5 seconds after the lapse of 2 seconds from the application was represented by Va (V), the average of the output voltages for 5 seconds after the lapse of 300 seconds was represented by Vb (V), and the initial voltage Va and a voltage change rate Vb/Va (V/V) were measured. Table 4 shows the results of the measurement. Here, the Va was 60.2 (V), which meant that the roller showed good electrical conductivity. In addition, the Vb/Va was 1.00, which showed that the electrical resistance remained nearly unchanged before and after the application of the DC voltage for 300 seconds.

Evaluation 2

The charging roller was subjected to energization with a DC current of 400 μA for 120 minutes by using the electrical resistance-measuring apparatus in the evaluation 1. Immediately after that, the charging roller was built as a charging roller in a laser printer (trade name: LBP5400, manufactured by Canon Inc.). Then, a halftone image was output and the image was evaluated.

Table 4 shows the results of the evaluation. It should be noted that evaluation ranks are as described below.

A: No image failure resulting from the resistance of the charging roller was observed.

B: An image failure resulting from the resistance of the charging roller was slightly observed.

C: An image failure resulting from the resistance of the charging roller was observed.

D: An image failure due to the abutment unevenness of the charging roller was observed.

TABLE 4

| | Electro-conductive layer material | Evaluation 1 Va (V) | Evaluation 1 Vb/Va (V/V) | Evaluation 2 Image | Hardness |
|---|---|---|---|---|---|
| Example 1 | Synthesis Example 1 | 60.2 | 1.00 | A | 68 |
| Example 2 | Synthesis Example 2 | 56.7 | 1.00 | A | 68 |
| Example 3 | Synthesis Example 3 | 60.3 | 1.00 | A | 67 |
| Example 4 | Synthesis Example 4 | 58.2 | 1.01 | A | 63 |

TABLE 4-continued

| | Electro-conductive layer material | Evaluation 1 Va (V) | Evaluation 1 Vb/Va (V/V) | Evaluation 2 Image | Hardness |
|---|---|---|---|---|---|
| Example 5 | Synthesis Example 5 | 69.8 | 1.01 | A | 70 |
| Example 6 | Synthesis Example 6 | 18.0 | 1.00 | A | 68 |
| Example 7 | Synthesis Example 7 | 75.0 | 1.01 | A | 67 |
| Example 8 | Synthesis Example 8 | 45.2 | 1.01 | A | 78 |
| Example 9 | Synthesis Example 9 | 30.5 | 1.01 | A | 90 |
| Example 10 | Synthesis Example 10 | 44.1 | 1.01 | A | 78 |
| Example 11 | Synthesis Example 11 | 30.9 | 1.02 | A | 90 |
| Example 12 | Synthesis Example 12 | 46.2 | 1.01 | A | 78 |
| Example 13 | Synthesis Example 13 | 32.2 | 1.02 | A | 90 |
| Example 14 | Synthesis Example 14 | 88.2 | 1.06 | A | 68 |
| Example 15 | Synthesis Example 15 | 68.2 | 1.06 | A | 78 |
| Example 16 | Synthesis Example 16 | 48.5 | 1.07 | A | 90 |
| Example 17 | Synthesis Example 17 | 165.5 | 1.09 | B | 67 |
| Example 18 | Synthesis Example 18 | 130.6 | 1.09 | B | 78 |
| Example 19 | Synthesis Example 19 | 85.5 | 1.09 | B | 90 |
| Comparative Example 1 | Unvulcanized rubber composition 1 | 74.0 | 2.05 | C | 48 |
| Comparative Example 2 | Unvulcanized rubber composition 1 | 230.1 | 12.00 | C | 50 |
| Comparative Example 3 | Synthesis Example 20 | 68.2 | 1.04 | D | 95 |
| Comparative Example 4 | Synthesis Example 21 | — | — | — | 70 |
| Comparative Example 5 | Synthesis Example 22 | — | — | — | 25 |
| Comparative Example 6 | Synthesis Example 23 | 240.5 | 1.45 | C | 42 |

Examples 2 to 19

Charging rollers of Examples 2 to 19 were produced and evaluated in the same manner as in Example 1 except that the sample of Synthesis Example 1 was changed to each of the samples of Synthesis Examples 2 to 19. Table 4 shows the results of the evaluations.

Comparative Example 1

An A-mixed rubber composition was obtained by mixing materials shown in Table 5 with a pressure kneader.

TABLE 5

| Material | Part(s) by mass |
|---|---|
| Raw material rubber: hydrin rubber (epichlorohydrin-ethylene oxide-allyl glycidyl ether terpolymer: epichlorohydrin 48 mol %; ethylene oxide 48 mol %; allyl glycidyl ether 4 mol %) | 100 |

TABLE 5-continued

| Material | Part(s) by mass |
|---|---|
| Processing aid: zinc stearate | 1 |
| Vulcanization supplement accelerator: zinc oxide | 5 |
| Filler: heavy calcium carbonate | 60 |
| MT carbon black (Thermax Floform N990 (trade name), manufactured by Cancarb) | 5 |
| Sebacic acid polyester plasticizer (molecular weight: 8,000) | 5 |
| Ionic electro-conductive agent: tetraethylammonium chloride | 2 |

Next, an unvulcanized rubber composition 1 was obtained by mixing materials shown in Table 6 with an open roll.

TABLE 6

| Material | Part(s) by mass |
|---|---|
| The A-mixed rubber composition | 177 |
| Crosslinking agent: sulfur | 1 |
| Vulcanization accelerator: dibenzothiazyl disulfide (MBTS: NOCCELER DM (trade name), manufactured by OUCHI SHINKO CHEMICAL INDUSTRIAL CO., LTD.) | 1 |
| Tetramethylthiuram monosulfide (TMTM: NOCCELER TS (trade name), manufactured by OUCHI SHINKO CHEMICAL INDUSTRIAL CO., LTD.) | 1 |

Next, a roller using the above-mentioned unvulcanized rubber composition 1 as an electro-conductive layer was obtained with a crosshead extruder in the same manner as in Example 1 except that the unvulcanized rubber composition 1 was used instead of the sample of Synthesis Example 1. After that, vulcanization under heating was performed at 160° C. for 2 hours, and then ends were subjected to a cutting-and-removing treatment. Thus, an electro-conductive roller whose elastomer-coated portion had a length in its axial direction of 232 mm was obtained. The electro-conductive roller was ground with a broad polisher (roller-dedicated CNC grinding machine LEO-600-F4L-BME (trade name)) at a cutting rate of 2 m/min until the central outer diameter became 8.5 mm and the outer diameter at each of both ends in the axial direction of the elastomer-coated portion became 8.3 mm. Thus, a charging roller was obtained. Here, evaluations were performed in the same manner as in Example 1. As a result, as shown in Table 4, the Va was 74.0 (V), which meant that the roller showed good electrical conductivity, but the Vb/Va was 2.05, which showed that the electrical resistance increased owing to the application of the DC voltage for 300 seconds. Accordingly, an image failure probably due to the resistance of the charging roller occurred in the evaluation 2.

Comparative Example 2

A charging roller was produced in the same manner as in Comparative Example 1 except that tetraethylammonium chloride of the ionic electro-conductive agent was not added, and was then similarly evaluated. The Va was 230.1 (V), which meant that the initial resistance was high. In addition, the Vb/Va was 12.0, which meant that the increase of the electrical resistance due to the application of the DC voltage for 300 seconds was observed. Accordingly, an image failure acknowledged to be due to the increase of the electrical resistance of the charging roller occurred in the evaluation 2.

Comparative Example 3

A charging roller was produced in the same manner as in Example 1 except that the sample of Synthesis Example 1 was changed to the sample of Synthesis Example 20, and was then similarly evaluated. Both the Va and the Vb/Va showed good values. However, the roller did not stably abut a photosensitive member because its hardness was high. Accordingly, an image failure resulting from the abutment unevenness occurred in the evaluation 2.

Comparative Example 4

A charging roller was produced in the same manner as in Example 1 except that the sample of Synthesis Example 1 was changed to the sample of Synthesis Example 21. The Va of the charging roller could not be measured because its resistance was high.

Comparative Example 5

A charging roller was produced in the same manner as in Example 1 except that the sample of Synthesis Example 1 was changed to the sample of Synthesis Example 22. However, the charging roller was unsuitable as a charging roller because the roller had a low hardness and no rubber elasticity. Accordingly, the roller was not evaluated.

Comparative Example 6

A charging roller was produced in the same manner as in Example 1 except that the sample of Synthesis Example 1 was changed to the sample of Synthesis Example 23, and was then similarly evaluated. The Va was 240.5 V, which meant that the initial resistance was high. Accordingly, an image failure probably due to the resistance of the charging roller occurred in the evaluation 2.

Developing Roller

Hereinafter, an example of the case where the electro-conductive member for electrophotography of the present invention was produced and used as a developing roller is described.

Example 20

A roller having an electro-conductive layer was produced in the same manner as in Example 1 except that: the mandrel of Example 1 was changed to a mandrel on which a primer was baked, and which had a diameter of 6 mm and a length in its axial direction of 279 mm; and the electro-conductive layer was changed to an electro-conductive layer produced by using the sample of Synthesis Example 6 on the surface of the mandrel except both ends in its axial direction, and having a thickness of 3 mm and a length in the axial direction of 235 mm. The roller was built as a developing roller in a laser printer (trade name: LBP5400, manufactured by Canon Inc.), and then a solid image and a halftone image were output. After that, a DC current of 400 μA was flowed in the roller with the electrical resistance-measuring apparatus in the evaluation 1 for 120 minutes. Immediately after that, the roller was built as a developing roller in the above-mentioned laser printer again, and then a solid image and a halftone image were output. Then, the images before and after the energization were compared and visually evaluated by the following criteria.

Rank A: Nearly no change in image density was observed before and after the energization with the DC current.

Rank B: A slight change in density was observed before and after the energization with the DC current.

Rank C: A remarkable change in density was observed before and after the energization with the DC current.

Examples 21 to 24 and Comparative Example 7

Developing rollers were produced and evaluated in the same manner as in Example 20 except that any one of the samples shown in Table 7 below was used as a material for forming an electro-conductive layer. Table 7 below shows the results of the evaluations of Examples 20 to 24 and Comparative Example 7.

TABLE 7

| | Material for forming electro-conductive layer | Evaluation rank |
|---|---|---|
| Example 20 | Sample of Synthesis Example 6 | A |
| Example 21 | Sample of Synthesis Example 7 | A |
| Example 22 | Sample of Synthesis Example 8 | A |
| Example 23 | Sample of Synthesis Example 11 | A |
| Example 24 | Sample of Synthesis Example 18 | B |
| Comparative Example 7 | Unvulcanized rubber composition 1 | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-158615, filed Jul. 13, 2010, which is hereby incorporated by reference herein in its entirety.

What is claimed is:

1. An electro-conductive member for electrophotography, comprising an electro-conductive mandrel and an electro-conductive layer, wherein said electro-conductive layer contains an A-B-A type triblock copolymer in which an A-block is a polystyrene having a cation exchange group, and a B-block is a polyolefin, and wherein said A-B-A type triblock copolymer forms a microphase-separated structure comprising a matrix phase formed of said B-block, and one phase formed of the A-block and having a structure selected from the group consisting of a cylindrical structure, a bicontinuous structure and a lamellar structure.

2. The electro-conductive member for electrophotography according to claim 1, wherein the cation exchange group comprises at least one selected from the group consisting of a sulfonic group, a phosphate group, and a carboxylic group.

3. The electro-conductive member for electrophotography according to claim 2, wherein the cation exchange group comprises a sulfonic group.

4. A process cartridge formed to be freely detachable from a main body of an electrophotographic apparatus, comprising the electro-conductive member for electrophotography according to claim 1 as one member selected from a charging member and a developing member or as each of both the members.

5. An electrophotographic apparatus, comprising the electro-conductive member for electrophotography according to claim 1 as one member selected from a charging member and a developing member or as each of both the members.

* * * * *